US008825075B2

United States Patent
Katayama et al.

(10) Patent No.: US 8,825,075 B2
(45) Date of Patent: Sep. 2, 2014

(54) TIMING OF SYNCHRONIZING SIGNAL

(75) Inventors: Hideyuki Katayama, Shizuoka (JP);
Masahiko Yahagi, Tokyo (JP)

(73) Assignees: NEC Corporation, Tokyo (JP); NEC Access Technica, Ltd., Shizuoka (JP)

( * ) Notice: Subject to any disclaimer, the term of this patent is extended or adjusted under 35 U.S.C. 154(b) by 107 days.

(21) Appl. No.: 13/055,812

(22) PCT Filed: Jul. 16, 2009

(86) PCT No.: PCT/JP2009/062867
§ 371 (c)(1),
(2), (4) Date: Jan. 25, 2011

(87) PCT Pub. No.: WO2010/018732
PCT Pub. Date: Feb. 18, 2010

(65) Prior Publication Data
US 2011/0130154 A1  Jun. 2, 2011

(30) Foreign Application Priority Data
Aug. 14, 2008 (JP) ................................. 2008-208981

(51) Int. Cl.
*H04W 72/00* (2009.01)
*H04W 56/00* (2009.01)

(52) U.S. Cl.
CPC ................................. *H04W 56/006* (2013.01); *Y02B 60/50* (2013.01)
USPC ................... 455/456.1; 455/456.2; 455/456.3; 455/456.4; 455/456.5; 455/502

(58) Field of Classification Search
USPC .......... 455/456.1, 456.2, 456.3, 456.4, 456.5, 455/456.6, 501, 502
See application file for complete search history.

(56) References Cited

U.S. PATENT DOCUMENTS

| | | | | |
|---|---|---|---|---|
| 5,857,155 | A | * | 1/1999 | Hill et al. .................... 455/456.3 |
| 8,233,917 | B2 | * | 7/2012 | Bae ............................ 455/456.3 |
| 2005/0043045 | A1 | * | 2/2005 | Cheng et al. ................. 455/502 |

FOREIGN PATENT DOCUMENTS

| | | |
|---|---|---|
| CN | 1251728 A | 4/2000 |
| CN | 101094444 A | 12/2007 |
| JP | 2000175238 A | 6/2000 |
| JP | 2002077037 A | 3/2002 |
| JP | 2008005003 A | 1/2008 |

OTHER PUBLICATIONS

Chinese Office Action for CN 200980131730.2 issued on Apr. 1, 2013 with English Translation.
International Search Report for PCT/JP2009/062867 mailed Aug. 18, 2009.

\* cited by examiner

*Primary Examiner* — Sharad Rampuria
*Assistant Examiner* — Sayed T Zewari
(74) *Attorney, Agent, or Firm* — Sughrue Mion, PLLC (57) ABSTRACT

Time information and positional information indicating the position at which a communication terminal is present are acquired from a GPS satellite, and, based on the acquired positional information and correspondence information which provides the association correspondence between the positional information indicating a position identified by latitude and longitude and the timing of a synchronizing signal for establishing synchronization at the position, the timing of the synchronizing signal for establishing synchronization between the communication terminal and the radio base station is identified.

7 Claims, 12 Drawing Sheets

| latitude | longitude | positional information |
|---|---|---|
| 00 | 00 | block 1 |
|  | 01 | block 2 |
|  | 10 | block 3 |
|  | 11 | block 4 |
| 01 | 00 | block 5 |
|  | 01 | block 6 |
|  | 10 | block 7 |
|  | 11 | block 8 |
| 10 | 00 | block 9 |
|  | 01 | block 10 |
|  | 10 | block 11 |
|  | 11 | block 12 |
| 11 | 00 | block 13 |
|  | 01 | block 14 |
|  | 10 | block 15 |
|  | 11 | block 16 |

Fig.9

| positional information | synchronizing signal timing |
|---|---|
| block 1 | t1 |
| block 2 | t2 |
| block 3 | t3 |
| ... | ... |
| block 15 | t5 |
| block 16 | t6 |

TIMING OF SYNCHRONIZING SIGNAL

This application is the National Phase of PCT/JP2009/062867, filed Jul. 16, 2009, which claims priority based on Japanese Patent Application 2008-208981 filed on Aug. 14, 2008, and should incorporate all the disclosure thereof herein.

TECHNICAL FIELD

The present invention relates to a communication terminal for communicating with a radio base station and a connecting method and program for a communication terminal to connect with a radio base station.

BACKGROUND ART

In a radio communication system using radio technology, a communication terminal realizes a network connection by exchanging various kinds of data by establishing synchronization with the synchronizing signal sent out from a radio base station.

Figure 1:
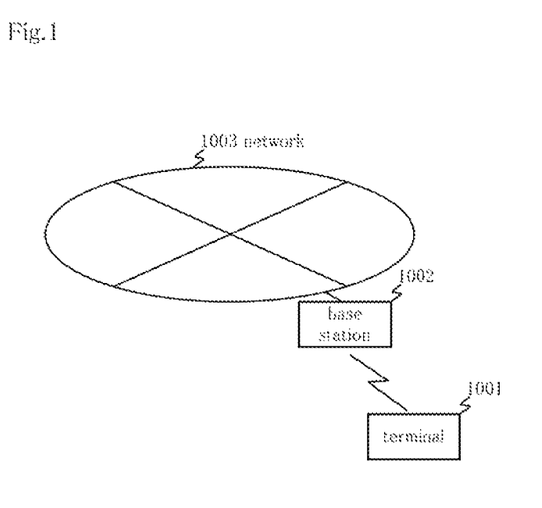
FIG. 1 is a diagram showing one mode of a typical radio communication system.

FIG. 1 is a diagram showing one mode of a typical radio communication system.

The radio communication system shown in FIG. 1 includes terminal 1001, base station 1002 and network 1003.

Terminal 1001 is a communication terminal having a radio communication function. For example, a mobile phone and a mobile terminal can be mentioned.

Base station 1002 is a radio base station that connects terminal 1001 with network 1003.

Network 1003 is a communication network, for example, may be a WiMAX (Worldwide Interoperability for Microwave Access) network.

Here, data to be transmitted and received between terminal 1001 and base station 1002 have to be transmitted and received in synchronization with the aforementioned synchronizing signal. Accordingly, terminal 1001 needs to detect the time (temporal position) of transmission of the synchronizing signal transmitted from base station 1002.

In order for terminal 1001 to detect the synchronizing signal transmitted from base station 1002, a search operation of searching the synchronizing signal is performed in a predetermined period of time (e.g., time for two frames) (see JP2000-175238A, for example).

Figure 2:
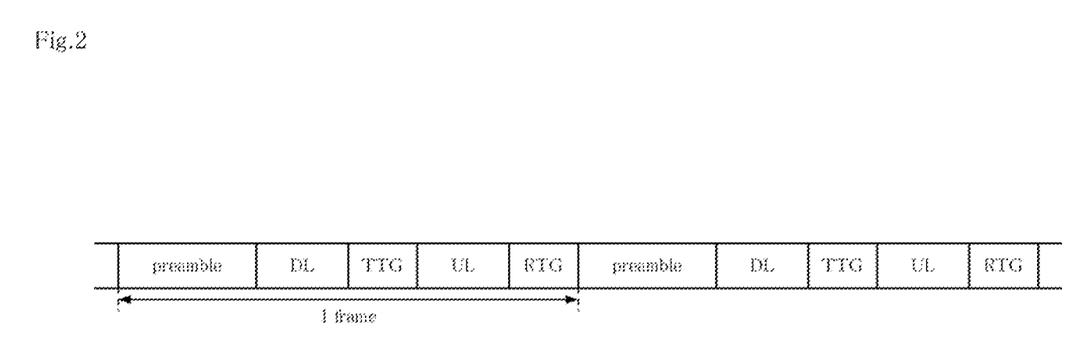
FIG. 2 is a diagram showing a format of data frames transmitted and received between a terminal and a base station when the network shown in FIG. 1 is a WiMAX network.

FIG. 2 is a diagram showing a format of data frames transmitted and received between terminal 1001 and base station 1002 when network 1003 shown in FIG. 1 is a WiMAX network.

As shown in FIG. 2, the data frame transmitted and received between terminal 1001 and base station 1002 is configured of a preamble indicating the lead of the data frame, DL or downlink data, UL or uplink data and TTG/RTG or Gap time for absorbing propagation delay between terminal 1001 and base station 1002. Here the preamble is used, as the synchronizing signal for establishing synchronization between terminal 1001 and base station 1002. This data frame is transmitted and received between base station 1002 and terminal 1001 in a predetermined cycle (in a cycle of 5 ms in a WiMAX system).

Figure 3:
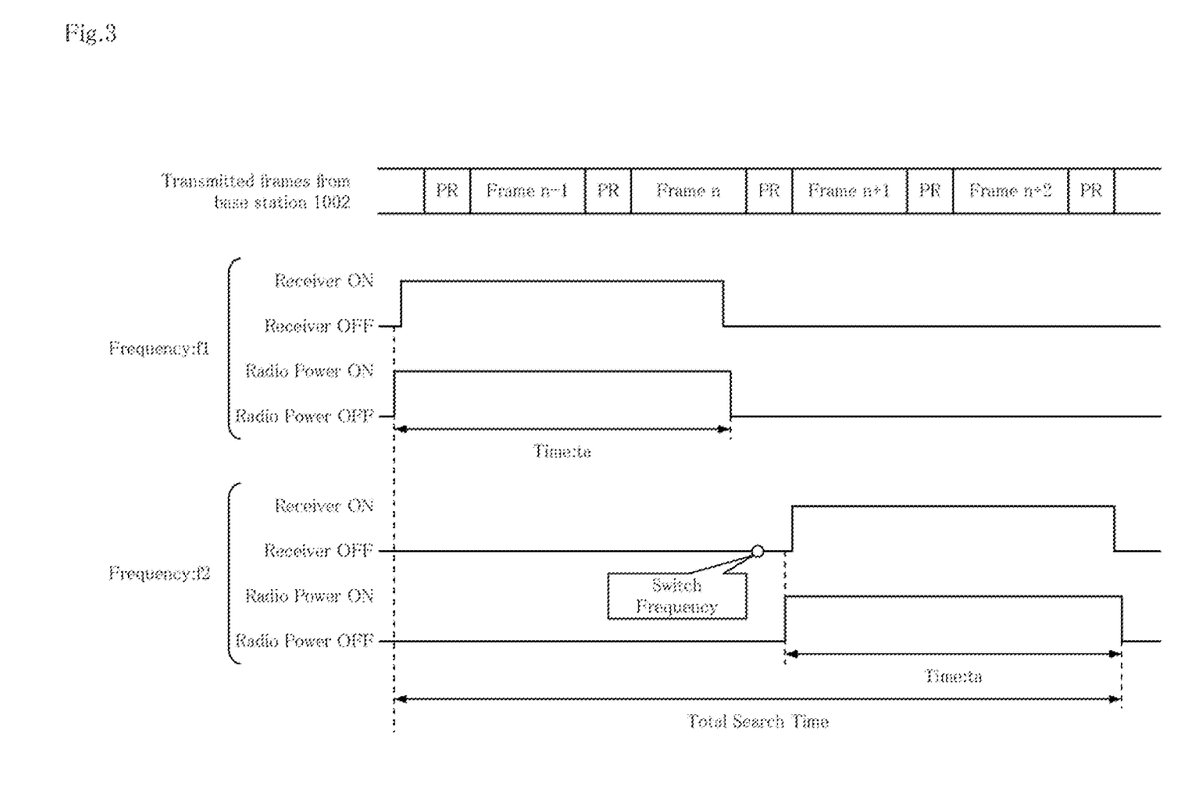
FIG. 3 is a diagram showing one example of the timing of a typical synchronizing signal search operation of a terminal in the radio communication system shown in FIG. 1.

FIG. 3 is a diagram showing one example of the timing of a typical synchronizing signal searching operation of terminal 1001 in the radio communication system shown in FIG. 1. In this case, description will be made taking an example where the PR (preamble) at the lead of the data frame transmitted from base station 1002 is used as the synchronizing signal.

First, a synchronizing signal searching process is performed at frequency f1 for the period of two frame intervals (time ta). At this time, a search process is performed at terminal 1001 for time ta with the radio Power set to ON and the receiver set to ON.

If no synchronizing signal is detected at frequency f1, the frequency is switched to frequency f2 and a further synchronizing signal searching process is performed for time ta with the radio Power set to ON and the receiver set to ON.

When the synchronizing signal is detected at frequency f2, the synchronizing signal search process will take the total search time shown in FIG. 3.

In this way, since the position of the synchronizing signal has not been able to be known at terminal 1001, it is necessary to perform a searching process for the predetermined time. Accordingly, problems have occurred in which power that is consumed in the search process is wasted and in which the search process takes time.

SUMMARY OF THE INVENTION

The object of the present invention is to provide a communication terminal and a connecting method and program for solving the above problems.

In order to attain the above object, the present invention provides a communication terminal having a radio communicating function, comprising:

a GPS module that acquires time information and positional information from a GPS satellite, indicating the position at which the communication terminal is present; and, a controller which, based on the positional information acquired by the GPS module and correspondence information which provides the association between the positional information indicating a position identified by latitude and longitude and the timing of a synchronizing signal for establishing synchronization at the position, identifies the timing of the synchronizing signal for establishing synchronization between the communication terminal and a radio base station to be connected to the communication terminal.

The invention also provides a connecting method for connecting a communication terminal to a network through a base station, comprising the steps of:

acquiring time information and positional information from a GPS satellite, indicating the position at which the communication terminal is present; and, based on the acquired positional information and correspondence information which provides the association between the positional information indicating a position identified by latitude and longitude and the timing of a synchronizing signal for establishing synchronization at the position, identifying the timing of the synchronizing signal for establishing synchronization between the communication terminal and the radio base station.

The present invention further provides a program that causes a communication terminal having a radio communication function to execute:

a procedure of acquiring time information and positional information from a GPS satellite, indicating the position at which the communication terminal is present; and, a procedure of, based on the acquired positional information and correspondence information which provides the association between the positional information indicating a position identified by latitude and longitude and the timing of a synchronizing signal for establishing synchronization at the position, identifying the timing of the synchronizing signal for establishing synchronization between the communication terminal and the radio base station to be connected to the communication terminal.

According to the present invention as descried above, since time information and positional information indicating the position at which a communication terminal is present are acquired from a GPS satellite, and, based on the acquired positional information and correspondence information which provides the association between the positional information indicating a position identified by latitude and longitude and the timing of a synchronizing signal for establishing synchronization at the position, the timing of the synchronizing signal for establishing synchronization between the communication terminal and the radio base station is identified, it is possible to reduce the time for connecting the communication terminal to a network and also to cut down power consumption for connection.

MODE FOR CARRYING OUT THE INVENTION

Now, the exemplary embodiment of the present invention will be described with reference to the drawings.

Figure 4:
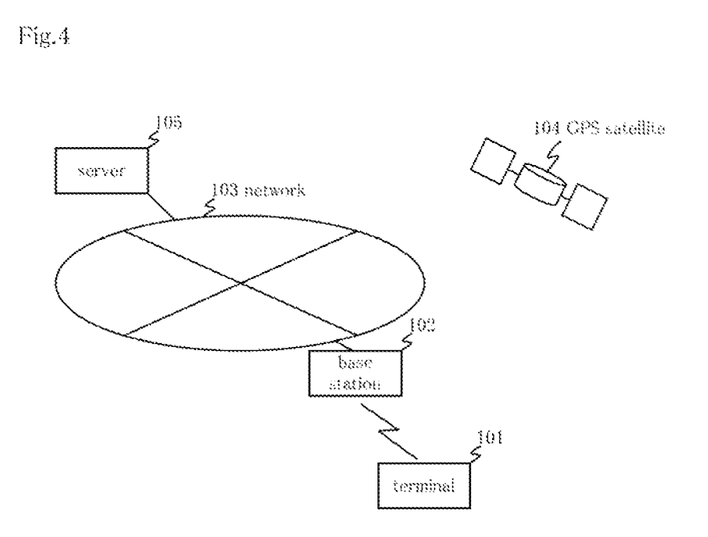
FIG. 4 is a diagram showing one exemplary embodiment of a communication terminal of the present invention.

FIG. 4 is a diagram showing one exemplary embodiment of a communication terminal of the present invention.

As shown in FIG. 4, the present embodiment is configured of terminal 101, base station 102, network 103, GPS satellite 104 and server 105.

Terminal 101 is a communication terminal having a radio communication function. For example, a mobile phone and a mobile terminal can be mentioned. Further, terminal 101 has a GPS (Global Positioning System) receiving function.

Base station 102 is a radio base station that connects terminal 101 and network 103.

Network 103 is a communication network, for example, may be a WiMAX (Worldwide Interoperability for Microwave Access) network.

GPS satellite 104 is a general satellite that transmits time information and positional information on terminal 101 to terminal 101.

Server 105 stores correspondence information on the association between positional information that indicates a position identified by the latitude and longitude and the frequency used at that position.

Figure 5:
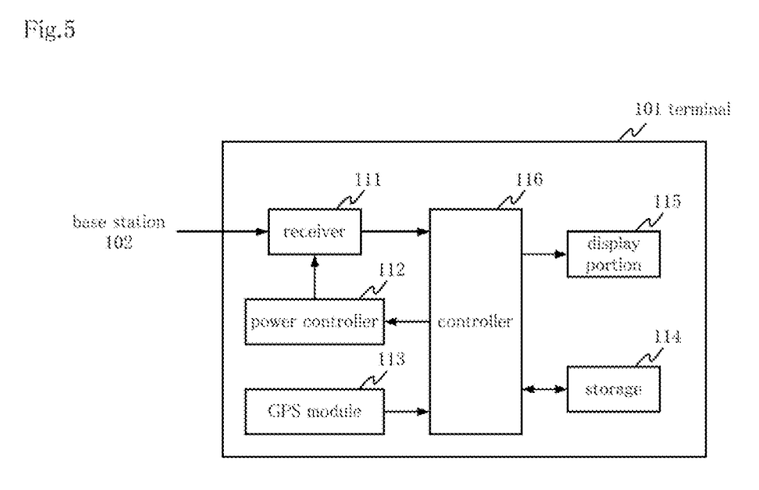
FIG. 5 is a diagram showing one example of the internal configuration of the terminal shown in FIG. 4.

FIG. 5 is a diagram showing one example of the internal configuration of terminal 101 shown in FIG. 4.

Terminal 101 shown in FIG. 4 includes receiver 111, power controller 112, GPS module 113, storage 114, display portion 115 and controller 116 for controlling these, devices as shown in FIG. 5.

Receiver 111 receives radio signals transmitted from base station 102. The received signal is converted into an electric signal and output to controller 116.

Power controller 112 performs radio power control when performing a process for detecting a synchronizing signal.

GPS module 113 is a general module for acquiring time information and positional information transmitted from GPS satellite 104.

Storage 114 is a memory for storing information.

Display portion 115 is a general display for displaying information.

Controller 116 controls these constituents. Controller 116 also performs a search process for a synchronizing signal based on the information stored in storage 114 and a signal output from receiver 111. Controller 116 also stores the aftermentioned correspondence information, among the signal output from receiver 111 into Storage 114.

Here in FIG. 5, among the constituents of terminal 101 shown in FIG. 4 the constituents that are involved in the present invention alone are shown.

Next, the connecting method of establishing a connection between terminal 101 and base station 102 in the present embodiment will be described.

Figure 6:
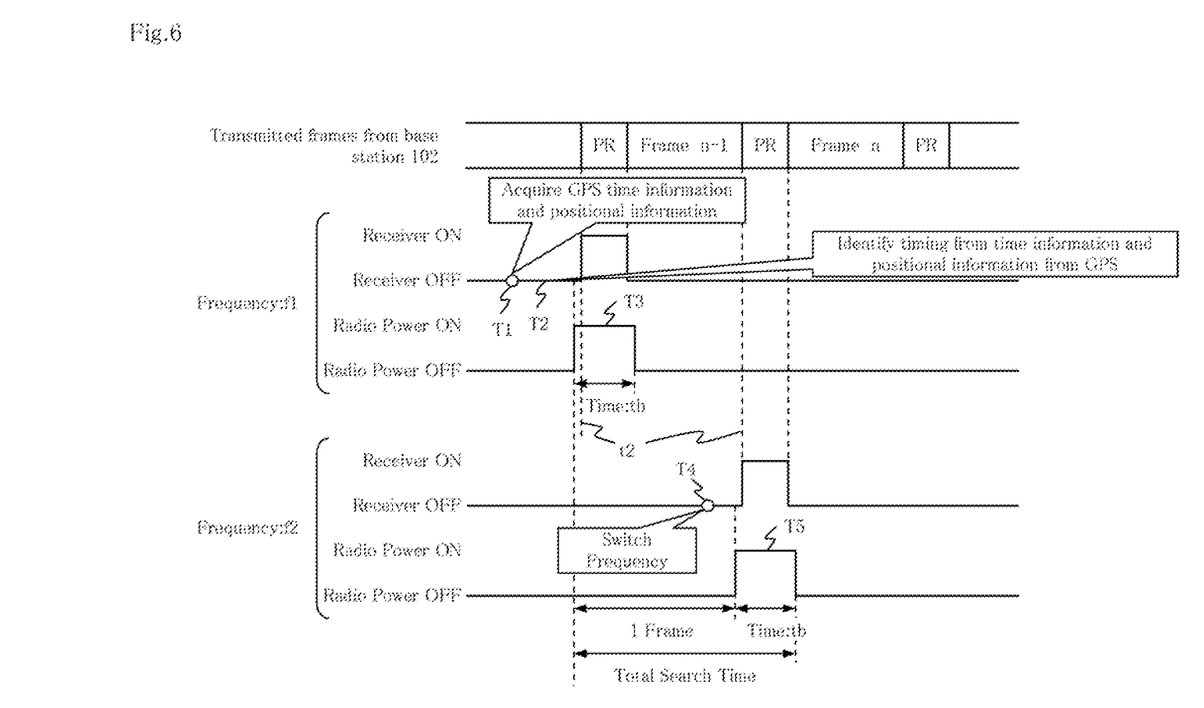
FIG. 6 is a timing chart for illustrating a connecting method between the terminal and base station in the mode shown in FIGS. 4 and 5.

FIG. 6 is a timing chart for explaining the method of establishing a connection between terminal 101 and base station 102 in the mode shown in FIGS. 4 and 5. Here, the case where a synchronizing signal is transmitted from base station 102 at timing t2 is described as an example. Further, the case where the PR (preamble) at the lead of the data frame transmitted from base station 102 is used as the synchronizing signal will be described as an example.

First, at timing T1, time information and positional information on terminal 101 are acquired from GPS satellite 104 by GPS module 113 of terminal 101.

Then, based on the acquired positional information and the information stored in storage 114 (the block identifying table and synchronizing signal timing identifying table, described hereinbelow), the timing of the synchronizing signal to be transmitted from the base station at the position indicated by the positional information is identified by controller 116, at timing T2.

Here, it is assumed in the communication system connected to network 103 shown in FIG. 4 that the communication range is divided into a plurality of sections each consisting of 16 kinds (patterns) of blocks depending on latitude and longitude. Each of the 16 kinds of blocks is defined with a different timing at which the synchronizing signal is transmitted from the base station.

Figure 7:
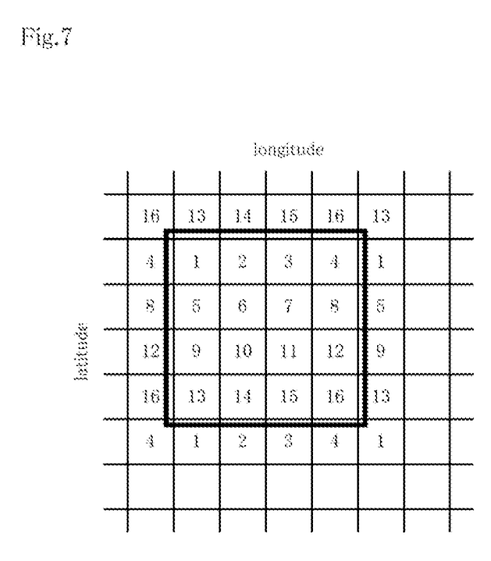
FIG. 7 is a diagram showing one example of a communication range that is divided into a plurality of sections each consisting of 16 kinds of blocks depending on latitude and longitude.

FIG. 7 is a diagram showing one example of the communication range that is divided into a plurality of sections each consisting of 16 kinds of blocks depending on latitude and longitude.

As shown in FIG. 7, the communication range is divided into a plurality of sections each consisting of 16 kinds of blocks (blocks 1 to 16) depending on latitude and longitude. In this system, an associated frequency is designated for each of the 16 kinds of blocks. Here, the size unit of one square (section) shown in FIG. 7 is 0° 04' represented in terms of latitude and longitude. That is, based on the two bits, or the third and fourth bits from the least significant bit, of the binarized values of the "X minutes" in terms of the longitude and latitude of the positional information, the block to which the position in question belongs can be identified.

Figure 8:
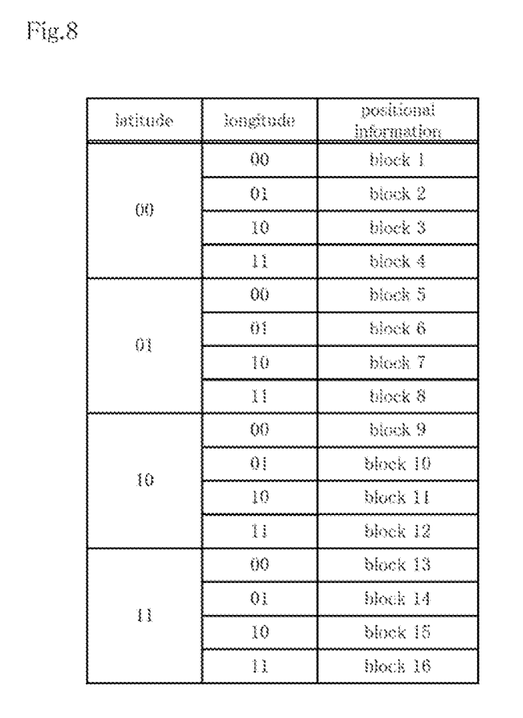
FIG. 8 is a diagram showing one example of a configuration of a block identifying table stored in the storage shown in FIG. 5.

FIG. 8 is a diagram showing one example of a configuration of a block identifying table stored in storage 114 shown in FIG. 5.

The block identifying table stored in storage 114 shown in FIG. 5 indicates the association between the predetermined bits of latitude and longitude and the positional information as shown in FIG. 8. Here, the predetermined bits of latitude and longitude use the two bits, or the third and fourth bits from the least significant bit, of the binarized values of the "X minutes" in terms of the longitude and latitude as stated above.

For example, the predetermined bits of latitude "00" and the predetermined bits of longitude "00" are made to correspond to positional information "block 1" and stored. This means that the positional information designated by the predetermined bits of latitude acquired by GPS module 113 being "00" and the predetermined bits of longitude being "00", is "block 1".

Similarly, the predetermined bits of latitude "00" and the predetermined bits of longitude "01" are made to correspond to positional information "block 2" and stored. This means that the positional information designated by the predetermined bits of latitude acquired by GPS module 113 being "00" and the predetermined bits of longitude being "01", is "block 2".

Similarly, the predetermined bits of latitude "00" and the predetermined bits of longitude "10" are made to correspond to positional information "block 3" and stored. This means that the positional information designated by the predetermined bits of latitude acquired by GPS module 113 being "00" and the predetermined bits of longitude being "10", is "block 3".

Similarly, the predetermined bits of latitude "00" and the predetermined bits of longitude "11" are made to correspond to positional information "block 4" and stored. This means that the positional information designated by the predetermined bits of latitude acquired by GPS module 113 being "00" and the predetermined bits of longitude being "11", is "block 4".

Similarly, the predetermined bits of latitude "01" and the predetermined bits of longitude "00" are made to correspond to positional information "block 5" and stored. This means that the positional information designated by the predetermined bits of latitude acquired by GPS module 113 being "01" and the predetermined bits of longitude being "00", is "block 5".

Similarly, the predetermined bits of latitude "01" and the predetermined bits of longitude "01" are made to correspond to positional information "block 6" and stored. This means that the positional information designated by the predetermined bits of latitude acquired by GPS module 113 being "01" and the predetermined bits of longitude being "01", is "block 6".

Similarly, the predetermined bits of latitude "01" and the predetermined bits of longitude "10" are made to correspond to positional information "block 7" and stored. This means that the positional information designated by the predetermined bits of latitude acquired by GPS module 113 being "01" and the predetermined bits of longitude being "10", is "block 7".

Similarly, the predetermined bits of latitude "01" and the predetermined bits of longitude "11" are made to correspond to positional information "block 8" and stored. This means that the positional information designated by the predetermined bits of latitude acquired by GPS module 113 being "01" and the predetermined bits of longitude being "11", is "block 8".

Similarly, the predetermined bits of latitude "10" and the predetermined bits of longitude "00" are made to correspond to positional information "block 9" and stored. This means that the positional information designated by the predetermined bits of latitude acquired by GPS module 113 being "10" and the predetermined bits of longitude being "00", is "block 9".

Similarly, the predetermined bits of latitude "10" and the predetermined bits of longitude "01" are made to correspond to positional information "block 10" and stored. This means that the positional information designated by the predetermined bits of latitude acquired by GPS module 113 being "10" and the predetermined bits of longitude being "01", is "block 10".

Similarly, the predetermined bits of latitude "10" and the predetermined bits of longitude "10" are made to correspond to positional information "block 11" and stored. This means that the positional information designated by the predetermined bits of latitude acquired by GPS module 113 being "10" and the predetermined bits of longitude being "10", is "block 11".

Similarly, the predetermined bits of latitude "10" and the predetermined bits of longitude "11" are made to correspond to positional information "block 12" and stored. This means that the positional information designated by the predetermined bits of latitude acquired by GPS module 113 being "10" and the predetermined bits of longitude being "11", is "block 12".

Similarly, the predetermined bits of latitude "11" and the predetermined bits of longitude "00" are made to correspond to positional information "block 13" and stored. This means that the positional information designated by the predetermined bits of latitude acquired by GPS module 113 being "11" and the predetermined bits of longitude being "00", is "block 13".

Similarly, the predetermined bits of latitude "11" and the predetermined bits of longitude "01" are made to correspond to positional information "block 14" and stored. This means that the positional information designated by the predetermined bits of latitude acquired by GPS module 113 being "11" and the predetermined bits of longitude being "01", is "block 14".

Similarly, the predetermined bits of latitude "11" and the predetermined bits of longitude "10" are made to correspond to positional information "block 15" and stored. This means that the positional information designated by the predetermined bits of latitude acquired by GPS module 113 being "11" and the predetermined bits of longitude being "10", is "block 15".

Similarly, the predetermined bits of latitude "11" and the predetermined bits of longitude "11" are made to correspond to positional information "block 16" and stored. This means that the positional information designated by the predetermined bits of latitude acquired by GPS module 113 being "11" and the predetermined bits of longitude being "11", is "block 16".

From this block identifying table, it is possible to obtain the positional information (block) based on only the predetermined bits of latitude and longitude, which are obtained by GPS module 113.

Figure 9:
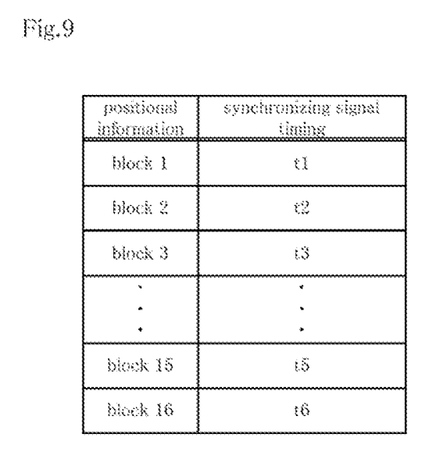
FIG. 9 is a diagram showing one example of a configuration of a synchronizing signal timing identifying table stored in the storage shown in FIG. 5.

FIG. 9 is a diagram showing one example of a configuration of a synchronizing signal timing identifying table stored in storage 114 shown in FIG. 5.

The synchronizing signal timing identifying table stored in storage 114 shown in FIG. 5 indicates the association between the positional information and the synchronizing signal timing as the timing for the synchronizing signal, as shown in FIG. 9.

For example, positional information "block 1" and synchronizing signal timing "t1" are made to correspond and stored. This indicates that the synchronizing signal is transmitted from base station 102 at the timing of "t1" when terminal 101 is present in "block 1" shown in FIG. 7.

Similarly, positional information "block 2" and synchronizing signal timing "t2" are made to correspond and stored. This indicates that the synchronizing signal is transmitted from base station 102 at the timing of "t2" when terminal 101 is present in "block 2" shown in FIG. 7.

Similarly, positional information "block 3" and synchronizing signal timing "t3" are made to correspond and stored. This indicates that the synchronizing signal is transmitted from base station 102 at the timing of "t3" when terminal 101 is present in "block 3" shown in FIG. 7.

Similarly, positional information "block 15" and synchronizing signal timing "t5" are made to correspond and stored. This indicates that the synchronizing signal is transmitted from base station 102 at the timing of "t5" when terminal 101 is present in "block 15" shown in FIG. 7.

Similarly, positional information "block 16" and synchronizing signal timing "t6" are made to correspond and stored. This indicates that the synchronizing signal is transmitted from base station 102 at the timing of "t6" when terminal 101 is present in "block 16" shown in FIG. 7.

In this way, use of the synchronizing signal timing identifying table stored in storage 114 makes it possible to identify the timing of the transmitted synchronizing signal allotted in accordance with the position of each of the 16 kinds of blocks.

Now, the size of each block shown in FIG. 7 will be described.

Figure 10:
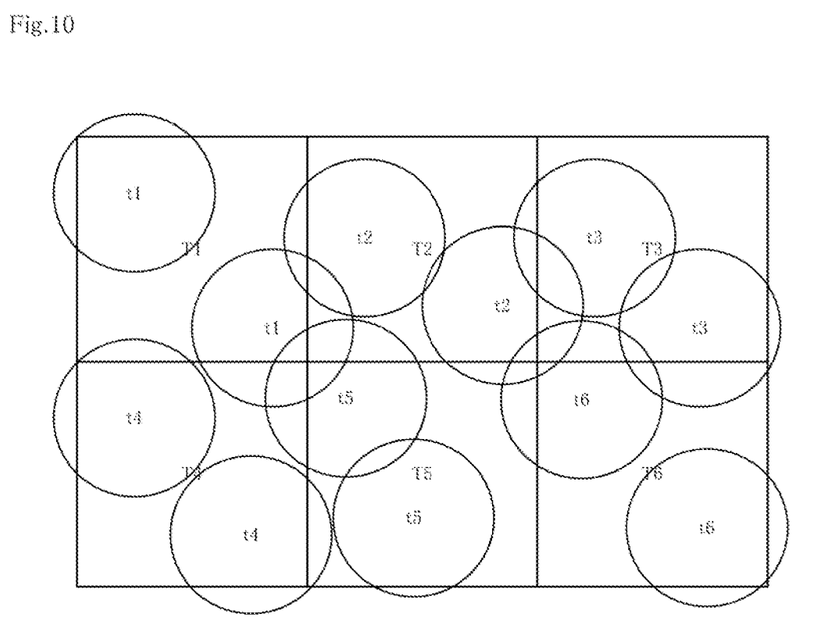
FIG. 10 is a diagram showing one example of the relationship between the timing calculated from general sectioned areas and the set timing of base stations in a WiMAX system.

FIG. 10 is a diagram showing one example of the relationship between the timing calculated from general sectioned areas (blocks in FIG. 7) and the set timing of base stations in a WiMAX system.

As shown in FIG. 10, when the timings calculated from the general sectioned areas (the squares in the drawing) are specified as T1 to T6 and the set timings for the base stations in the WiMAX system (the coverage areas of base stations are assumed to be the circles in the drawing) are denoted as t1 to t6, the timing for the largest sectioned area in the coverage area of a base station in the WiMAX system is determined as the set timing. Alternatively, the timing for the sectioned area in which the largest number of WiMAX terminals are present among the coverage areas of a base station may be determined as the set timing for the base station.

Figure 11:
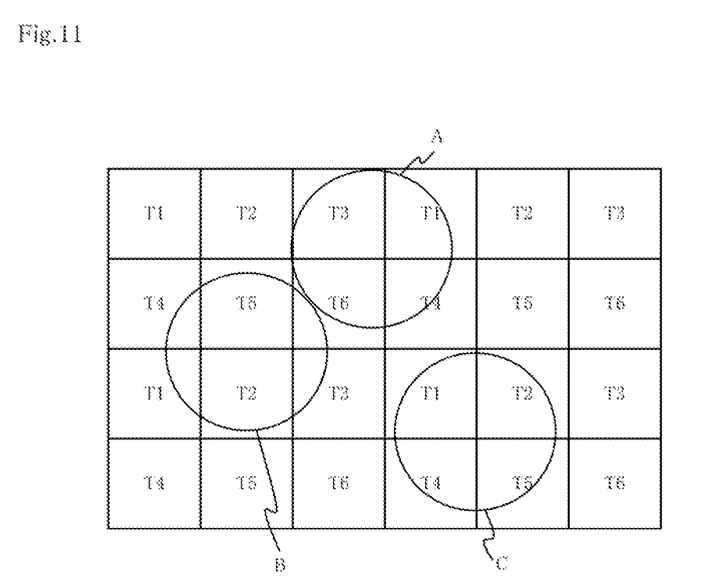
FIG. 11 is a diagram showing one example of timing relationships when general sectioned areas are smaller than the coverage areas of base stations in a WiMAX system.

FIG. 11 is a diagram showing one example of timing relationships when general sectioned areas are smaller than the coverage areas of base stations in the WiMAX system.

As shown in FIG. 11 for example, the timing used for a base station that has a coverage area "A" may take multiple values T3, T1, T6 and T4. Also, the timing used for a base station that has a coverage area "B" may take multiple values T4, T5, T6, T1, T2 and T3. Further, the timing used for a base station that has a coverage area "C" may take multiple values T1, T2, T4 and T5. Accordingly, in order to allot the timing to be calculated from a sectioned area to a base station in the WiMAX system with low ambiguity, it is necessary to take a broader sectioned area than the coverage area of the base station in the WiMAX system. For example, it is also possible to take the length of the side of a sectioned area about twice as long as the diameter of the coverage area of a base station in the WiMAX system.

The tables shown in FIGS. 8 and 9 show only part of the correspondence information of frequencies associated with positional information corresponding to latitude and longitudinal for a broad range (e.g., the whole Japanese territory, or the like) stored in server 105 having a large capacity storage area, a part corresponding to a specific range (e.g., ward, city, prefecture, or the like) in which terminal 101 is present. In this case, based on the positional information on terminal 101 acquired by GPS module 113, a predetermined range (table range) is determined by controller 116 so that information on the determined table range is acquired. This table range may also be calculated based on positional information and a previously determined threshold. For example, when the threshold is given as a 10 kilometer radius, the range within a 10 kilometer radius from the position of terminal 101 obtained from GPS module 113 is determined as the table range and the corresponding information included in that range is acquired. Alternatively, based on the positional information on terminal 101 acquired by GPS module 113, the ward, city, prefecture or the like to which the position in question belongs, may be determined so that the determined ward, city, prefecture or the like may be determined to be the table range.

As to the method of acquisition, data may be acquired by directly connecting terminal 101 to server 105 or may be acquired from server 105 through network 103. Specifically, of the signals received by receiver 111, correspondence information is stored by controller 116 into storage 114. At this time, the information may be information that is stored in the format of each table shown in FIGS. 8 and 9.

For example, when the predetermined bits of the latitude indicated by the positional information acquired from GPS satellite 104 at GPS module 113 at timing T1 are "00" and the predetermined bits of the longitude are "01", the block identifying table stored in storage 114 is referred to by controller 116 so that terminal 101 is recognized as being present in block 2. Further, the synchronizing signal timing identifying table stored in storage 114 is referred by controller 116 so that synchronizing signal timing "t2" corresponding to block 2 is identified.

Then, a frequency search is performed using the identified timing "t2". First, at timing T3, a search is performed at frequency f1. When no synchronizing signal is detected at frequency f1, the frequency is switched from f1 to f2 at timing T4. Then, at timing T5, a search at frequency f2 is performed.

At this time, the synchronizing signal search process is activated for only the length of the synchronizing signal (preamble) from the identified timing "t2". That is, a synchronizing signal search process on the received signal at receiver 111 is performed for the period of time corresponding to the length of the synchronizing signal (preamble) from the identified timing "t2". Here, radio power is turned ON for time tb at power controller 112 in order to perform the synchronizing signal search process.

In this way, the total search time is reduced by identifying the timing of the synchronizing signal.

After detection of the synchronizing signal, terminal 101 is connected to network 103 by way of base station 102 using frequency "f2" and the detected synchronizing signal.

Here, there are conceivable cases where terminal 101 cannot receive any signal that is transmitted from base station 102 at the identified timing by using the above-described process.

A process when terminal 101 cannot receive any signal that is transmitted from base station 102 at the identified timing by using the above-described process, will be described hereinbelow.

Figure 12:
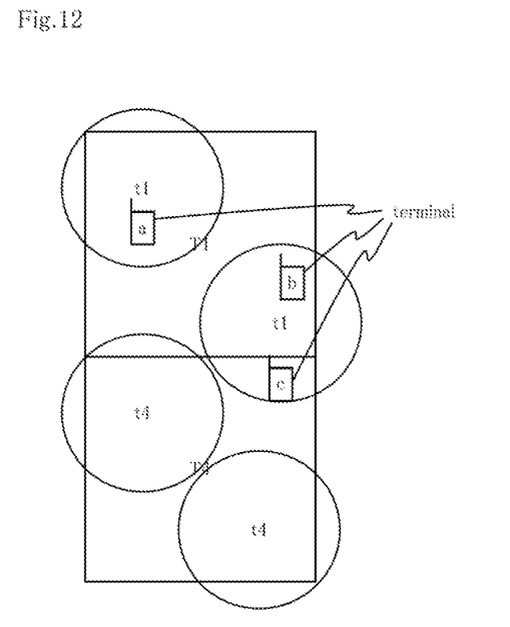
FIG. 12 is a diagram showing one example in which a terminal exists at a position where the terminal cannot receive the signal that is transmitted at the identified timing from its base station.

FIG. 12 is a diagram showing one example in which terminal 101 is present at a position where terminal 101 cannot receive the signal that is transmitted from base station 102 at the identified timing.

As shown in FIG. 12, for example, terminal a and terminal b calculate timing T1 based on the sectioned area. The timing of the base stations in the WiMax system is also t1. Accordingly, it is possible to obtain the timing correctly.

However, although the timing calculated for terminal c based on the sectioned area is T4, the timing of the base station of the WiMax system that can be communicated with itself is not t4 but t1. As a result, it is impossible to obtain the timing correctly at the timing calculated based on the sectioned area.

In this case, the searching operation at the general synchronizing signal timing described with reference to FIG. 3 is performed.

The aforementioned process of terminal 101 may be executed by logical circuits manufactured in accordance with purposes. Or, the program that describes the procedures of the processing content may be recorded into a recording medium that is readable at terminal 101, and the program recorded in this recording medium may be loaded into terminal 101 so as to be executed. The recording mediums readable at terminal 101 include, other than removable recording mediums such as floppy disks (registered trademark), magneto-optical disks, DVDs, CDs and the like, memory devices such as ROM, RAM etc., HDDs and the like that are built in terminal 101. The program recorded on this recording medium is loaded by controller 116 in terminal 101 and the same process as above is executed by controller 116. In this case, terminal 101 is an entity that operates as a computer to execute the program loaded from a recording medium with the program recorded thereon.

From the above, it is no longer necessary to perform a long-time searching process when terminal 101 connects to network 103 through base station 102. Thereby, it is possible to prevent the wasteful use of power that is needed for the search process, and it is also possible to reduce the time taken for the search process. In sum, it is possible to easily reduce the time required for terminal 101 to connect to network 103 and it is also possible to easily cut down power consumption that is needed for establishing a connection.

As the present invention has been described heretofore by referring to the exemplary embodiment, the present invention should not be limited to the above exemplary embodiment. Various changes that will be understood by those skilled in the art can be added to the configurations and details of the present invention within the scope of the present invention.

The invention claimed is:

1. A communication terminal having a radio communicating function, comprising:
   a GPS module that acquires time information and positional information from a GPS satellite, indicating the position at which the communication terminal is present;
   a controller which, based on the positional information acquired by the GPS module and correspondence information which provides the association between the positional information indicating a position of a radio base station to be connected to the communication terminal identified by latitude and longitude and the timing of a synchronizing signal for establishing synchronization at the position, identifies the timing of the synchronizing signal for establishing synchronization between the communication terminal and the radio base station; and
   a receiver that, from a server that stores the correspondence information, acquires correspondence information included in the range determined by the controller based on the positional information acquired by the GPS module, wherein
   the controller, based on the positional information acquired by the GPS module and the correspondence information acquired by the receiver, identifies the timing of the synchronizing signal for establishing synchronization between the communication terminal and the radio base station, and
   the controller, based on a part of bits of each of latitude and longitude as the positional information acquired by the GPS module, refers to the correspondence information acquired by the receiver, and identifies the timing of the synchronizing signal for establishing synchronization between the communication terminal and the radio base station.

2. The communication terminal according to claim 1, further comprising a storage that stores the correspondence information acquired by the receiver, wherein
   the controller, based on a part of the positional information acquired by the GPS module and the correspondence information stored in the storage, calculates and identifies the timing of the synchronizing signal for establishing synchronization between the communication terminal and the radio base station.

3. The communication terminal according to claim 1, wherein the communication terminal is connected to a WiMAX network through the radio base station.

4. A connecting method for connecting a communication terminal to a network through a radio base station, comprising the steps of:
   acquiring time information and positional information from a GPS satellite, indicating the position at which the communication terminal is present;
   based on the acquired positional information and correspondence information which provides the association between the positional information indicating a position of the radio base station identified by latitude and longitude and the timing of a synchronizing signal for establishing synchronization at the position, identifying the timing of the synchronizing signal for establishing synchronization between the communication terminal and the radio base station;
   determining a range for which the correspondence information is acquired based on the acquired positional information;
   acquiring correspondence information included in the range from a server that stores the correspondence information;

identifying the timing of the synchronizing signal for establishing synchronization between the communication terminal and the radio base station, based on the acquired positional information and the correspondence information included in the range; and identifying the timing of the synchronizing signal for establishing synchronization between the communication terminal and the radio base station, by referring to the correspondence information included in the range based on a part of bits of each of latitude and longitude as the acquired positional information.

5. The connecting method according to claim 4, further comprising the steps of:

storing correspondence information included in the range into the communication terminal; and, calculating and identifying the timing of the synchronizing signal for establishing synchronization between the communication terminal and the radio base station, based on a part of the acquired positional information and the stored correspondence information.

6. A non-transitory computer-readable storage medium storing a program that causes a communication terminal having a radio communication function to execute:

a procedure of acquiring time information and positional information from a GPS satellite, indicating the position at which the communication terminal is present;

a procedure of, based on the acquired positional information and correspondence information which provides the association between the positional information indicating a position of a radio base station to be connected to the communication terminal identified by latitude and longitude and the timing of a synchronizing signal for establishing synchronization at the position, identifying the timing of the synchronizing signal for establishing synchronization between the communication terminal and the radio base station;

a procedure of determining a range for which the correspondence information is acquired based on the acquired positional information;

a procedure of acquiring correspondence information included in the range from a server that stores the correspondence information;

a procedure of identifying the timing of the synchronizing signal for establishing synchronization between the communication terminal and the radio base station, based on the acquired positional information and the correspondence information included in the range; and a procedure of identifying the timing of the synchronizing signal for establishing synchronization between the communication terminal and the radio base station, by referring to the correspondence information included in the range based on a part of bits of each of latitude and longitude as the acquired positional information.

7. The non-transitory computer-readable storage medium according to claim 6, storing the program that causes the communication terminal to execute:

a procedure of storing correspondence information included in the range into the communication terminal; and, a procedure of calculating and identifying the timing of the synchronizing signal for establishing synchronization between the communication terminal and the radio base station, based on a part of the acquired positional information and the stored correspondence information.

* * * * *